United States Patent [19]
de Oliveira Bandarra et al.

[11] Patent Number: 5,282,884
[45] Date of Patent: Feb. 1, 1994

[54] PROCESS FOR THE RECOVERY OF NOBLE METALS AND TERTIARY PHOSPHINES

[75] Inventors: Joao J. de Oliveira Bandarra, Loures; Alexandre J. Ganchas de Carvalho, Lisbon; William Heggie, Palmela, all of Portugal

[73] Assignee: Plurichemie Anstalt, Liechtenstein, Fed. Rep. of Germany

[21] Appl. No.: 999,319

[22] Filed: Dec. 31, 1992

[30] Foreign Application Priority Data

Dec. 31, 1991 [PT] Portugal .................................. 99958
Dec. 31, 1991 [PT] Portugal .................................. 99959

[51] Int. Cl.$^5$ ............................................. C22B 11/04
[52] U.S. Cl. ...................................................... 75/724
[58] Field of Search ........................................... 75/724

[56] References Cited

U.S. PATENT DOCUMENTS 4,687,514 8/1987 Renner et al. ......................... 75/109

FOREIGN PATENT DOCUMENTS 0097842 of 0000 European Pat. Off. .

OTHER PUBLICATIONS

Hackh's Chemical Dictionary, ed. by J. Grant 4th edition, p. 33 (1972).

*Primary Examiner*—Peter D. Rosenberg
*Attorney, Agent, or Firm*—Ostrolenk, Faber, Gerb & Soffen

[57] ABSTRACT

The present invention concerns a process for the recovery of a noble metal from an inorganic and/or organic residue in the form of a tellurium/noble metal precipitate characterised by adding a solvent having a boiling point above 120° C. to the residue, removing by distillation water and other residual solvents having boiling points below the boiling point of the added solvent, adding the tellurium or reducible tellurium compound, and then refluxing at atmospheric pressure before separating the tellurium/noble metal precipitate. The process of the present invention also allows the simultaneous recovery of the tertiary phosphine as its oxide from a residue containing a tertiary phosphine by the further stages of concentrating the mother-liquors remaining after separation of the tellurium/noble metal precipitate, recovering the added high boiling point solvent and isolating the tertiary phosphine in the form of its oxide by precipitation with water.

20 Claims, No Drawings

PROCESS FOR THE RECOVERY OF NOBLE METALS AND TERTIARY PHOSPHINES

Noble metals are being used more and more in industrial processes, especially in catalytic systems. Metals such as platinum, palladium, ruthenium, rhodium, rhenium, iridium, gold and silver are considered extremely important and, with the increasing shortage of world-wide resources, their conservation is particularly important.

In the case of catalytic systems, the recovery of the noble metal is usually relatively simple for a heterogeneous catalytic system, even when the quantities are low. In this case, the catalyst is filtered, centrifuged or isolated by another method which separates the solid catalyst from the liquid phase of the reaction. The catalyst is then reactivated or the noble metal recovered therefrom.

Homogeneous catalysts represent a more difficult problem with respect to the isolation of the catalyst or the noble metal consumed, wherein the catalyst is present in a high dilution in a complex reaction mixture. Given that the noble metal can be present in concentrations of the order of 1 part in 10,000, the isolation by simple methods is not always feasible. Moreover, the other components of the reaction system frequently interfere with the isolation process or render its costs extremely high.

As a significant part of noble metal homogeneous catalytic systems, used industrially, are complexes containing triphenylphosphine or other tertiary phosphines, it is necessary to recover not only the noble metal but also the tertiary phosphine used.

European Patent No. 0 097 842 describes a process for the recovery of noble metals from homogeneous reaction mixtures, by treatment with tellurium or a reducible tellurium compound. This process consists of the treatment of the catalytic reaction mixture, after isolation of the desired product of the reaction, with tellurium metal at temperatures between 100° and 250° C. for a suitable period of time, until all of the noble metal has been isolated from the solution as a precipitate with tellurium. This prior art process is specifically designed for the recovery of noble metals, either from aqueous media or from non-volatile organic solvents.

In the case of reactions carried out in solvents having a low boiling point, European Patent No. 0 097 842 teaches that the treatment of the mother-liquors of the crude reaction mixture can be performed at high pressures in order to attain high temperatures, necessary for the formation of the tellurium/noble metal precipitate. Volatile solvents of which alcohols, especially methanol, are the most typical examples, cannot be used alone or together with water in the process of fixation of the noble metal, without resort to high pressures. Moreover, it has been established that during the treatment of the mother-liquors at high pressures and temperatures, a dangerous pressure increase is observed, which can render the process extremely hazardous.

We have now devised an improved process for the recovery of noble metals. According to the present invention, there is provided a process for the recovery of a noble metal from an inorganic and/or organic residue by contacting the residue with tellurium or a reducible tellurium compound at an elevated temperature to fix the noble metal to the tellurium, and thereafter separating the precipitate from the residue, characterised by adding a solvent having a boiling point above 120° C. to the residue, removing by distillation water and other residual solvents having boiling points below the boiling point of the added solvent, adding the tellurium or a reducible tellurium compound, and then refluxing at atmospheric pressure before separating the precipitate of the noble metal.

In the present invention the use of high pressures, and also of expensive high pressure reaction vessels, can be avoided by substituting the low boiling point solvent by another having a higher boiling point, preferably between 120° and 200° C. It is advantageous that the solvent has a boiling point in the mid-range of the above mentioned limits merely for reasons of energy conservation, it being thereby easier to maintain the mixture under reflux. The solvent should also have reducing properties since it has been established that these are advantageous for the complete fixation of the noble metal. The most suitable solvents for this purpose are dimethylformamide, dimethylacetamide or diglyme (1,1'-oxybis[2-methoxyethane]).

This improvement has the advantages that high pressure facilities are not necessary. Additionally, the removal of the original low boiling point solvents allows a better fixation of the noble metal.

This invention is applicable to the recovery of noble metals from the mother-liquors of any industrial process in which there are dissolved salts or complexes of noble metals, colloidal metal, as well as aqueous extraction solutions.

The process of the present invention also allows the simultaneous recovery of the tertiary phosphine as its oxide from a residue containing a tertiary phosphine by the further stages of concentrating the mother-liquors remaining after separation of the precipitate of the noble metal, recovering the added high boiling point solvent and isolating the tertiary phosphine in the form of its oxide by precipitation with water. This, after reduction, can be recycled, thereby eliminating the serious ecological problems caused by organs-phosphorus compounds.

The present process is especially suitable for the recovery of triphenylphosphine oxide and rhodium following use of the Wilkinson catalyst and its analogues, and also of the catalysts claimed in European Patents Nos. 0 086 046, 0 187 436, 0 283 615, 0 283 616, as well as in European Patent application No. 90308327.7.

This invention can also be advantageously applied to the treatment of heterogeneous catalytic systems that show a degree of dissolution or formation of noble metal colloids. In this case, the residual noble metal in the mother-liquors can also be recovered by the present process.

In the preferred process of the present invention, after the addition of dimethylformamide, or other suitable solvent, to the reaction mixture, or to the concentrated residue, containing the noble metal, the water and/or low boiling point solvents present are removed by distillation, thereby being substituted by dimethylformamide before the addition of tellurium or the reducible tellurium compound. Alternatively, the tellurium can be added before the removal of the solvents, followed by distillation and substitution by dimethylformamide, or other suitable solvent. The reaction mixture is then refluxed, usually for 5 to 25 hours, until all the noble metal in the solution binds to the tellurium. The reaction mixture is then cooled and filtered. A small volume of solid is thus obtained, which has a noble metal content of approximately 1% to 2%, thereby greatly increasing the concentration of the noble metal in the substance to be treated for recovery of the noble metal. The noble metal can then be recovered from the precipitate by conventional methods.

After filtration of the precipitate, the high boiling point solvent is recovered by low pressure distillation and recycled.

After distillation of the high boiling point solvent, the tertiary phosphine is recovered, as the oxide, by precipitation of the residue with water.

The following examples serve only to illustrate the present invention and are not in any way to be considered as a limitation thereof.

EXAMPLE 1

Water (350 ml) was added to the mother-liquors (7 lt., containing 198.8 mg of rhodium) of a hydrogenation, as described in Example 3 of European Patent No. 0 283 616, and a total of 6.3 lt. of solvent was distilled. Hydrated tellurium oxide (9.37 g, containing 7.17 g of tellurium), as well as dimethylformamide (1.05 lt.) were then added. Distillation was continued until an internal temperature of 153° C. was reached in the liquid after which the mixture was refluxed for 15 hours. The mixture was then cooled to room temperature and the solid material was filtered, washed with dimethylformamide and then with methanol. After drying in an oven at 35° C., the solid weighed 8.6 g and had a rhodium content of 2.07%, corresponding to 178 mg and a fixation of 93.3% of the original rhodium content.

The mother-liquors from this treatment were then concentrated by distillation of 1.05 lt. of dimethylformamide and precipitated in water. The solid thus obtained, after filtration and drying at 35° C., was shown to be triphenylphosphine oxide. It is possible to obtain a product of high purity (melting point 156° C.) by treatment with activated charcoal in methanol.

EXAMPLE 2

10,000 lt. of mother-liquors, resulting from the filtration of hydrogenation reaction mixtures, as mentioned above, were concentrated to a volume of 1,300 lt. for recovery of the organic solvents.

The residue, containing 270 g of rhodium, was dissolved in 1,500 lt. of dimethylformamide. By means of a distillation column, with reflux, water and residual solvents with boiling points lower than 150° C. were removed, retaining the dimethylformamide. Hydrated tellurium oxide (6.75 kg of tellurium) was added and the mixture refluxed for 15 hours, at about 150° C. After cooling, the tellurium/rhodium precipitate was filtered and washed various times with dimethylformamide and water. The precipitate (about 9 kg) was analysed by atomic absorption spectrophotometry and found to contain 235 g of rhodium (87% fixation).

The mother-liquors were treated in the same way as described in Example 1, to recover triphenylphosphine as its oxide.

EXAMPLE 3

Hydrated tellurium oxide (1.251 g) was added to a concentrate containing 30.1 mg of platinum in dimethylformamide (325 ml) and the mixture distilled until a temperature of 145° C. was obtained. Heating was continued for 15 hours and, after cooling, the precipitate filtered. The resulting solid (1.197 g) was analysed, giving a platinum content of 2.4% showing a fixation of 95.5% of platinum.

When this experiment was repeated using dimethylacetamide, the platinum fixation was also 95.5%.

Similar experiments using combinations of dimethylformamide, dimethylacetamide or diglyme as solvent with concentrates containing the other noble metals gave similar results.

We claim:

1. In a process for the recovery of a noble metal form an inorganic residue or organic residue, or mixture thereof, by contacting the residue with tellurium or a reducible tellurium compound at an elevated temperature to fix the noble metal to the tellurium, and thereafter separating the resulting tellurium/rhodium precipitate from the residue, the improvement which comprises adding a solvent having a boiling point above 120° C. to the residue, removing by distillation water and solvents having boiling points below the boiling point of the added solvent, adding the tellurium or a reducible tellurium compound, and then refluxing at atmospheric pressure before separating the tellurium/noble metal precipitate.

2. Process according to claim 1, wherein the noble metal containing residue originates from a hydrogenation reaction, catalysed by a noble metal catalyst, wherein the catalyst is a homogeneous catalyst comprising a noble metal and a tertiary phosphine, or a heterogeneous noble metal catalyst.

3. Process according to claim 1, wherein the residue contains a tertiary phosphine and the process includes the further steps of concentrating the mother-liquors remaining after separation of the tellurium/noble metal precipitate, recovering the added high boiling point solvent and isolating the tertiary phosphine in the form of its oxide by precipitation with water.

4. Process according to claim 1 wherein the tertiary phosphine is triphenylphosphine.

5. Process according to claim 1, wherein the noble metal is Pt, Pd, Ru, Rh, Re, Ir, Au or Ag.

6. Process according to claim 1, wherein the residue to be treated results from reactions using tris(triphenylphosphine)chlororhodium (I) and its analogues, di([L-hydrazine-$N^1$:$N^2$)-bis[bis(triphenylphosphine)rhodium (I)]dinitrate or dichloride, or $\mu$-3-carbopentazane-$N^1$,$N^4$:$N^2$,$N^5$-bis[bis(triphenylphosphine)rhodium (I)] dinitrate and wherein the noble metal to be recovered is rhodium.

7. Process according to claim 1, wherein the added solvent is dimethylformamide and the removal of the residual solvents is carried out by fractional distillation until the temperature of the reaction mixture exceeds 150° C.

8. Process according to claim 1, wherein the added solvent is dimethylacetamide or diglyme, or a mixture of the two.

9. Process according to claim 1, wherein that the reflux with tellurium or one of its reducible compounds is carried out at a reaction temperature between 120° and 200° C. to achieve complete formation of the tellurium/noble metal precipitate.

10. Process according to claim 1, wherein the high boiling point solvent is recovered and then recycled in the same process.

11. Process according to claim 9 in which the time of reflux is between 5 and 25 hours.

12. Process according to claim 1, wherein the noble metal is Rh.

13. Process according to claim 2, wherein the residue contains a tertiary phosphine and the process includes the further steps of concentrating the mother-liquors remaining after separation of the tellurium/noble metal precipitate, recovering the added high boiling point solvent and isolating the tertiary phosphine in the form of its oxide by precipitation with water.

14. Process according to claim 13, wherein the tertiary phosphine is triphenylphosphine.

15. Process according to claim 14, wherein the noble metal is Pt, Pd, Ru, Re, Ir, Au or Ag.

16. Process according to claim 14, wherein the noble metal is Rh.

17. Process according to claim 13, wherein the noble metal is Pt, Pd, Ru, Re, Ir, Au or Ag.

18. Process according to claim 13, wherein the noble metal is Rh.

19. Process according to claim 2, wherein the noble metal is Pt, Pd, Ru, Re, Ir, Au or Ag.

20. Process according to claim 2, wherein the noble metal is Rh.

* * * * *

UNITED STATES PATENT AND TRADEMARK OFFICE
CERTIFICATE OF CORRECTION

PATENT NO. : 5,282,884
DATED : February 1, 1994
INVENTOR(S) : J. De Oliveira Bandarra et al It is certified that error appears in the above-indentified patent and that said Letters Patent is hereby corrected as shown below:

Column 2, line 40, for "organs-phosphorus" should read --organo-phosphorus--.

Column 4, line 10, for "form" should read --from--; line 15, for "rhodium" should read --noble metal--; line 29, after "catalyst" should read --, used optionally in the presence of a tertiary phosphine--; line 37, for "1" should read --2--; line 40, delete "Rh,"; line 43 "L" should read --$\mu$-- ; and line 57, delete "that".

Signed and Sealed this

Thirty-first Day of May, 1994

Attest:

BRUCE LEHMAN

Attesting Officer        Commissioner of Patents and Trademarks